Sept. 25, 1945.   F. J. SIGMUND ET AL   2,385,385
LIQUID-TIGHT STATOR
Filed July 9, 1942   4 Sheets-Sheet 4

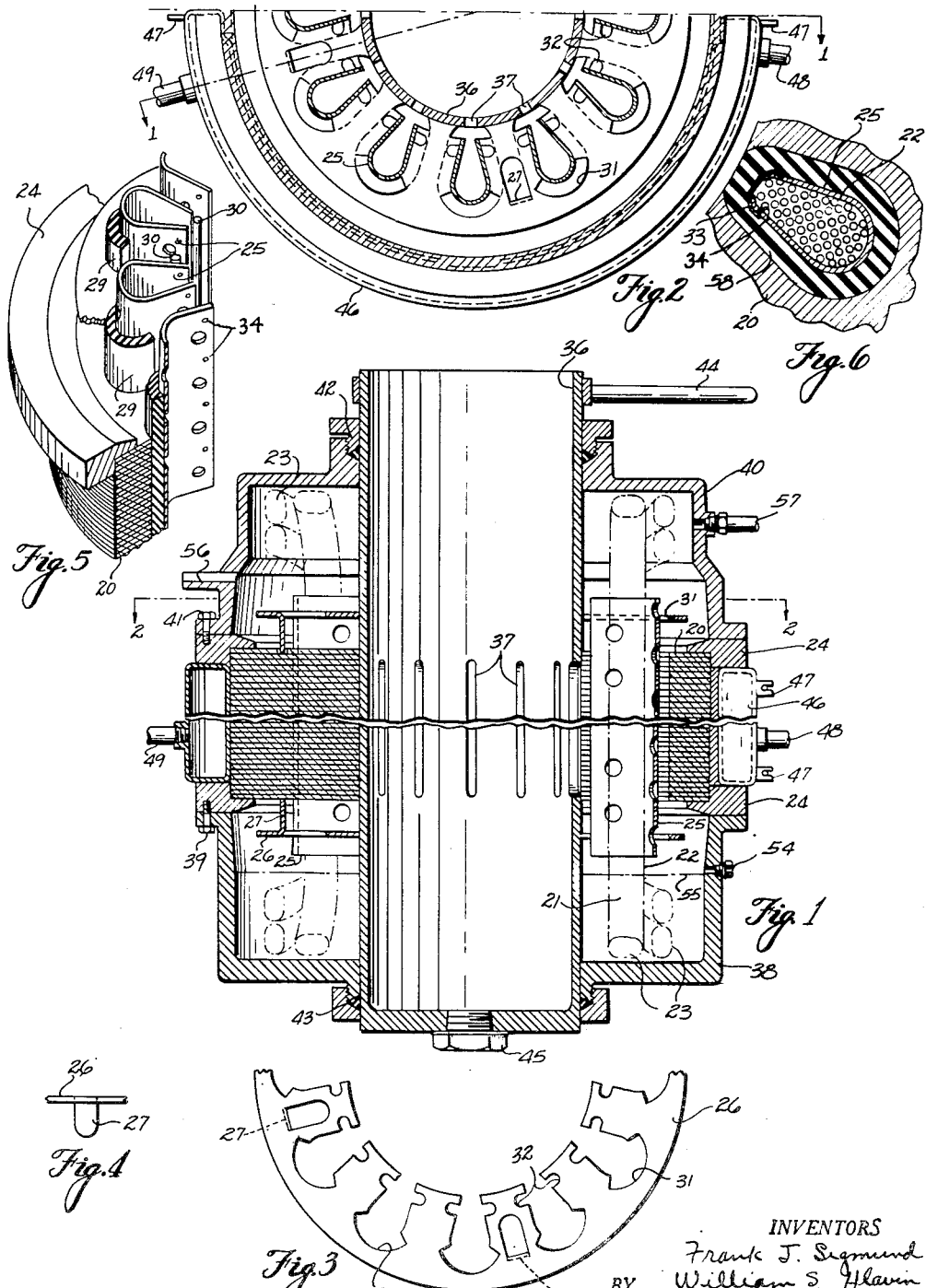

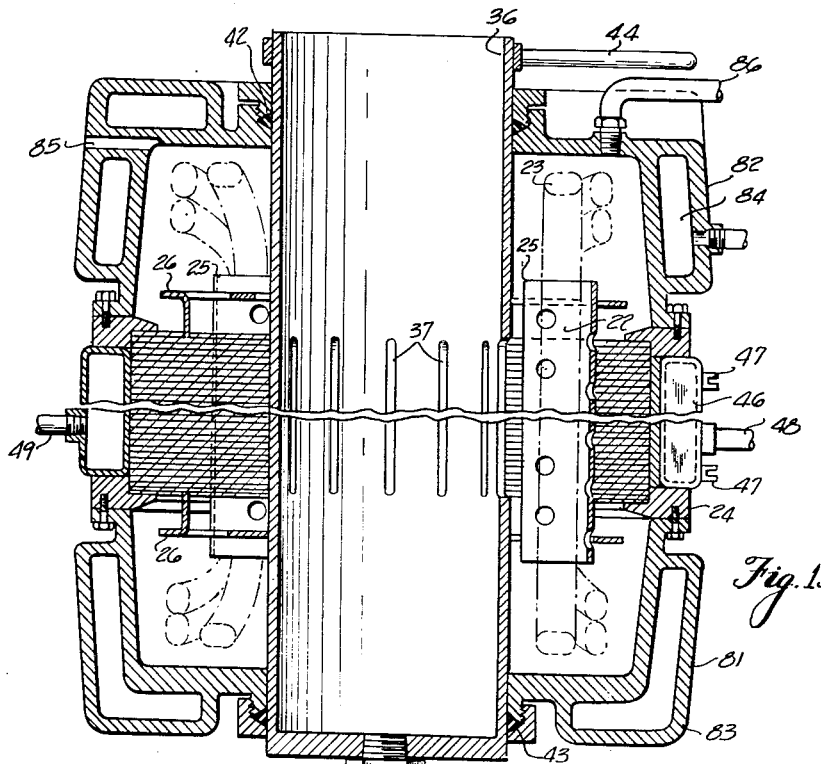
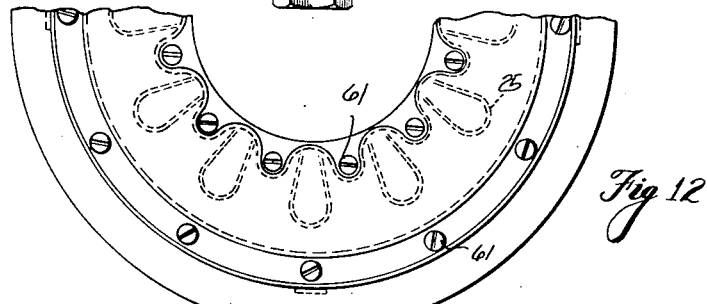
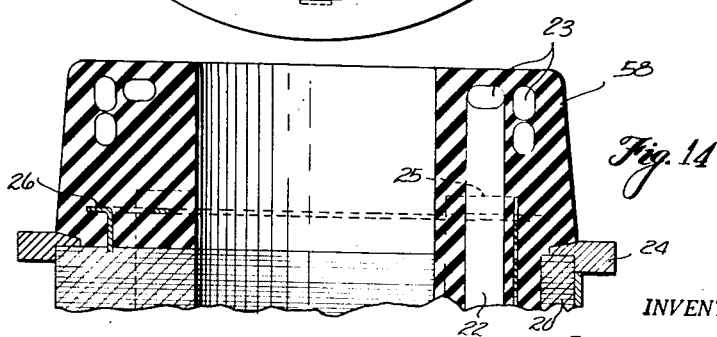

INVENTORS
Frank J. Sigmund
BY William S. Hlavin

Woodling and Krost
attys.

Patented Sept. 25, 1945

2,385,385

UNITED STATES PATENT OFFICE 2,385,385

LIQUID-TIGHT STATOR

Frank J. Sigmund and William S. Hlavin, Cleveland, Ohio, assignors, by mesne assignments, to Sigmund Corporation, a corporation of Ohio Application July 9, 1942, Serial No. 450,240

10 Claims. (Cl. 171—252)

Our invention relates in general to winding elements for dynamo-electric machines and more particularly to plastic-tight winding elements which may be submersed in liquid or operated at high speeds and voltages and which will withstand a great deal of vibration without damage.

The term "plastic-tight" refers to the fact that the winding elements have been made tight by the use of plastic or any other similar material which may be castable or injected about the winding elements to render the winding elements water-proof, dust-proof, insulation-proof and vibration-proof.

An object of our invention is the provision of employing a castable or ejectable material for making the windings of a dynamo-electric machine plastic-tight.

Another object of our invention is the provision of centralizing the windings within the slots of the stator or rotor so that the castable or ejectable material may completely surround the windings and prevent them from contacting the magnetizable core of the stator or rotor.

Another object of our invention is the provision of making a plastic-tight stator or rotor without the employment of high pressures for adapting the castable or ejectable material about the windings.

In this application and throughout the claims, for brevity, the term "castable" includes plastic-tight material which has been either poured or injected into the dies; that is, the term "castable" includes ejected material as well as cast material. The terms "plastic-tight" and "liquid-tight" will be used interchangeably to denote the same thing.

Other objects and a fuller understanding of our invention may be had by referring to the accompanying description and claims, taken in conjunction with the drawings, in which:

Figure 1 is a cross-sectional view of a stator taken in conjunction with dies employed to cast or eject the castable material about the windings of the stator; the section of Figure 1 being taken along the line 1—1 of Figure 2;

Figure 2 is a cross-sectional view taken along the line 2—2 of Figure 1 and shows particularly the sleeves for holding the windings of the stator at a spaced radial distance from the inside surface of the slots of the stator;

Figure 3 is a fragmentary plan view of a spacer plate employed to center the sleeves within the slots of the stator;

Figure 4 is a fragmentary view of Figure 3 showing the tabs which support the spacer plate from the ends of the stator;

Figure 5 is a fragmentary and perspective view showing the arrangement of the sleeves which are positioned in the slots of the stator;

Figure 6 is an enlarged cross-sectional view of a fragmentary portion surrounding a slot after it has been cast or ejected with the plastic-tight material;

Figure 12 is a fragmentary view of the stator and more particularly the top view of the stator shown in Figure 7 which shows the cover plate screwed to the end of the castable material;

Figure 13 is a view similar to Figure 1 but shows a modified arrangement of the casting die whereby the entire windings are embedded within the castable material;

Figure 14 is a fragmentary end view of a stator made by the dies in Figure 13;

Figure 7:
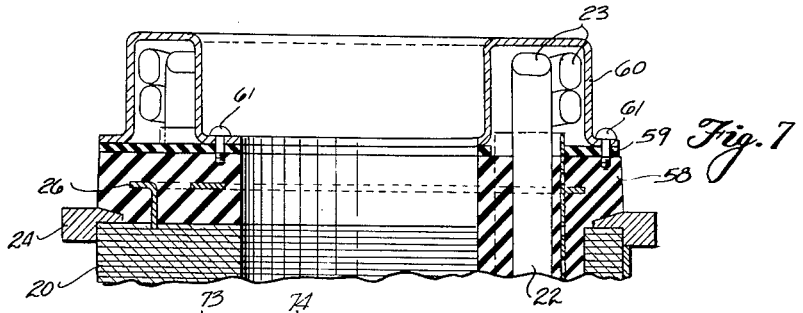
Figure 7 shows the upper end of a fragmentary view of a stator made in accordance with the principle of our invention.

With reference to Figure 1 which shows a cross-sectional view of a stator taken in conjunction with castable dies preparatory to casting the castable material about the windings of the stator to make a liquid-tight stator which may be operated under water or other liquid, the magnetizable core is identified by the reference character 20 which carries windings 21 comprising a plurality of coils positioned in the longitudinal slots thereof. The portion of the coils which lie within the slots may be designated as coil sides and the portion of the coils which extend beyond the end of the magnetizable core 20 may be designated as coil heads. In the drawings, the coil sides are indicated by the reference character 22 and the coil heads by the reference character 23. The laminations of the magnetizable core 20 may be held together in any suitable manner and as illustrated ring plates 24 positioned upon each end of the core may be employed for this purpose. The ring plates 24 tightly compress the laminations together to make a rigid construction. Within the slots of the magnetizable core, we insert perforated sleeves 25 having openings in their side walls so that the castable material may readily flow in intimate contact with the windings which are enveloped by the perforated sleeves. The object of the perforated sleeves is to centralize the coil sides within the slots of the stator so that the coil sides do not mechanically touch the magnetizable core. The ends of the perforated sleeves are centralized within the slots by means of spacer plates 26 which are disposed at a spaced distance from the ends of the magnetizable core. In Figure 1 the spacer plates 26 are provided with tabs 27 which engage suitable notches or recesses in the end face of the core so that the spacer plates 26 are constrained against lateral movement with respect to the magnetizable core. As shown in Figure 3, the spacer plate 26 is provided with a plurality of notched openings which are in substantial alignment with the slots of the stator. The notched openings are arranged to receive the ends of the perforated sleeves 25 to hold the sleeves at a radial distance from the inside surface of the slots of the stator.

In certain constructions of submersible motors, the length of the motor may be relatively long in the range of one to eight feet or longer, and in these types of construction we provide for supporting the perforated sleeves in order that they may not give as the coil sides are being inserted in the slots. For this type of construction, we employ a plurality of backing devices or flexible strips 29 and a plurality of side rods 30, see Figure 5, which will sometimes be referred to as backing means. The rear strips 29 extend from one spacer plate to the other and are arcuate in cross-section so as to fit within the enlarged cut away portion 31 as shown in Figure 3. The side rods 30 also extend between the spacer plate 26 and are arranged to fit in the arcuate side notches 32. Considerable pressure may be applied to the coil sides while they are being inserted in the perforated sleeves within the slots so that with the use of the backing means as indicated, the sleeves still maintain their centralized position within the slots. After the coil sides are inserted within the sleeves and the wires are properly adjusted, the backing strips 29 and rods 30 are removed by withdrawing them in one direction from the spacer plate and the slots of the stator. The strips and rods are made flexible so that they may be bent to clear the windings as they are removed.

After the backing means are removed, the stator is ready to be mounted in the castable die preparatory to the pouring in of the castable material. The castable dies comprise a cylindrical feed tube 36 and a bottom housing 38 and a top housing 40. The longitudinal feed tube 36 is cylindrical in form and is arranged to closely fit within the opening of the stator. The intermediate portion of the cylindrical feed tube is provided with longitudinal vertical feed openings 37 which are in alignment with the slots of the stator so that the castable material which is supplied to the cylindrical feed tube 36 may directly flow into the slots of the stator. The castable materials may comprise castable resins which are thermo-setting and which upon setting are capable of being machined, or worked by any suitable cutting tool. The resins may be incorporated with asbestos or other inorganic fillers to improve their mechanical, electrical and thermal properties. In actual practice we find "Catalin" very satisfactory. Other types of phenol-aldehydes may be used instead of "Catalin." The castable material when inserted in the longitudinal feed tube 36 is in liquid form and may flow to all of the small crevices and openings about the windings of the stator. The bottom housing 38 may be secured to the ring plate 24 by means of screws 39 and the top housing 40 may be secured to the ring plate by the screws 41. The lower end of the cylindrical feed tube 36 is sealed within the bottom housing 38 by means of a packing gland 43 and the upper end of the cylindrical feed tube 36 is sealed to the top housing 40 by means of a packing gland 42. The upper end of the cylindrical feed tube 36 is provided with a handle 44 so that after the castable material begins to set the handle 44 may be turned so that the slots 37 align themselves with the teeth of the stator so that the liquid castable material can no longer flow back into the cylindrical feed tube 36. The liquid castable material may then be drained from the cylindrical feed tube 36 by removing the through plug 45 at the bottom of the cylindrical feed tube. The liquid resin or "Catalin" may be set by heating the same at about 80 degrees C. for a predetermined period. When finally set the liquid resin becomes hard and provides a good liquid-proof envelope for the wires or coils in the slots of the stator. The liquid resin or "Catalin" may be set by the use of heating jackets 46 which may be in the form of two semi-cylindrical housings clamped about the outside of the magnetizable core by means of clamping tabs 47. The heating jacket may be supplied with heated oil or any other liquid through the pipes 48 and 49. In order to reduce the amount of time required to set the liquid resin or "Catalin," the core may be pre-heated to approximately the correct temperature before the liquid resin is poured into the cylindrical feed tube 36.

In Figure 1 the coil heads are still exposed after the castable material is set, and these coil heads are subsequently covered by means of a cover plate 60 which may be screwed or otherwise fastened by means of screws 61 to the castable material. Throughout the drawings the castable material is indicated by the reference character 58. A gasket 59 may be placed under the cover 60 in order to make a good fluid tight connection, see Figure 7. The upper end of the castable material 58 in the top housing 40 is determined by the liquid resin or "Catalin" flowing out of the overflow outlet 56. The lower end of the castable material in the bottom housing 38 is determined by first putting a suitable material in the bottom housing 38 which when it reaches the drain 54 overflows to define a level as indicated by the line 55. The material is permitted to solidify after which the plug 54 is reinserted so that the liquid resin or "Catalin" may be supplied to the longitudinal cylindrical tube 36. The material supplied to the bottom portion of the bottom housing 38 remains in a solidified form during the application of the liquid resin or "Catalin" in the castable dies. After the liquid resin or "Catalin" has become set the bottom housing 38, the top housing 40 and the longitudinal cylindrical feed tube 36 may be removed from the stator. Prior to securing the cover plate 60 to the ends of the castable material 58, the ends may be machined to produce a true flat surface so that after the cover plate 60 is secured to the castable material there is no possibility of leakage. Inasmuch as there may be a difference in the coefficient of expansion between the castable material and the laminated magnetizable core, the inside surface of the slots of the stator may be first applied with a coating of varnish or any other suitable material so that there might be microscopic movement between the castable material and the lamination due to the difference in the coefficient of expansion. The use of the varnish or any other suitable material permits this relative movement without damage to the castable material. The castable material in the slots completely envelops the windings and in effect makes a liquid-tight container for the windings, see Figure 6 of the drawings.

Figure 9:
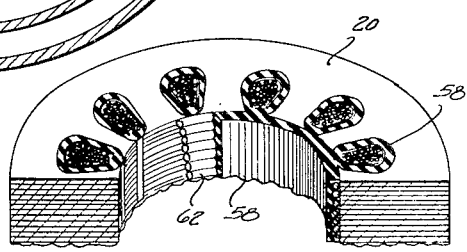
Figure 9 is a fragmentary view of the stator showing the employment of a coiled wire tube embedded in the opening within the stator.
Figure 11:
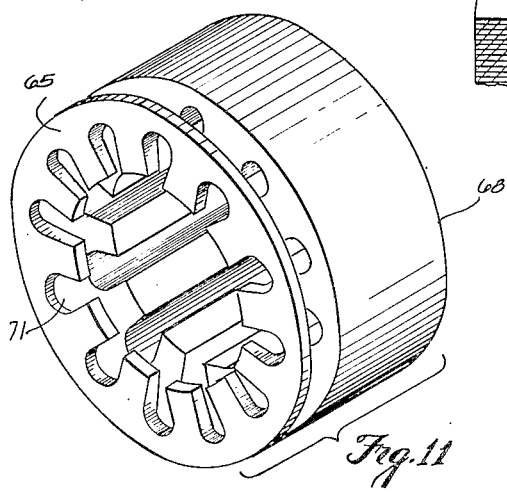
Figure 11 is a perspective view of a cast piece of castable material from which a spacer plate may be cut and used in centering the wires within the slots of the stator.

In Figure 9 we show a modification of the stator in that we employ a coiled tube 62 which may be formed of wire and is arranged to fit closely within the opening of the stator. The wires may be made of magnetic material and may be secured together by welding beads along the outside of the coil tube. The welded beads may fit within the slots of the stator and are arranged to be embedded within the castable material when casting the material thereabout. The coiled tube produces in effect a closed tooth for the stator and gives a good starting torque.

Figure 8:
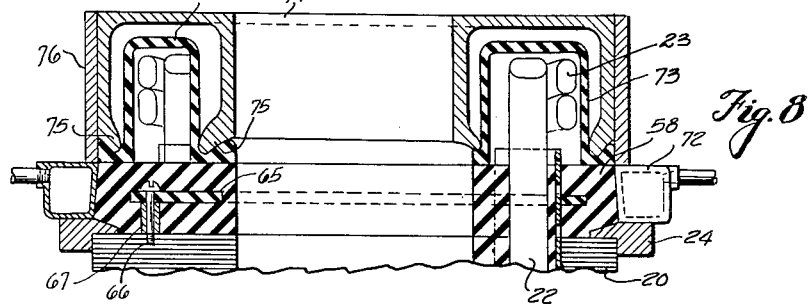
Figure 8 is a view similar to Figure 8 showing a modified form of constructing our invention.
Figure 10:
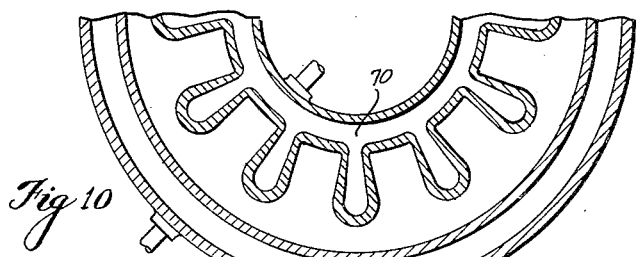
Figure 10 shows a fragmentary cross-sectional view of a castable die employed to make the casting shown in Figure 12 and from which the spacer plate may be cut.

In Figure 8 we show a modified form of a spacer plate and is indicated by the reference character 65 which may be made of the same castable material as is used to cast the windings within the stator. As illustrated in Figure 8, the spacer plate 65 may be held at a distance away from the end of the lamination by means of a hollow tube 67 and a screw 66 which may be spaced at intervals around the lamination. The spacer plate 65 may be made by slicing off a thin plate from the mass of annular body 68 which may be formed by securing the same within the castable die shown in Figure 10. In curing the castable material or annular body 68, the outside jacket 69 may be maintained at a higher temperature than the inside jacket 70. Thus for example the outside jacket 69 may be heated by oil at a temperature around 80 degrees C. where the inside jacket 70 may be heated by oil around the temperature of 60 degrees C., with the result that the portion of the castable material about the recesses 71 which receive the ends of the sleeves 25 may be relatively soft. The soft material about the sleeves 25 may be worked with the fingers of the operator so as to secure the sleeve within the spacer plate 65. That is to say, the portion about the recesses 71 may be soft something like relatively stiff putty so that the material may be pressed to fit closely around the sleeves inserted therein. The working of the castable material about the ends of the sleeves avoids the use of glue or other adhesive material which may be desirable for gluing or otherwise adhering the ends of the sleeves into the metal spacer plate 26 as shown in Figures 1 and 3. The spacer plate 65 may be cut from the annular body 68 by any suitable cutting tool. In Figure 8 we show another form of a cover housing for the exposed coil heads of the windings and in this form we employ a cover cap 73 made of the same castable material as that used for enveloping the windings in the slots of the stator. The castable material upon the ends of the laminations are cured by heat developed within the end jacket 72 which may be of a lower temperature than the temperature employed in the jacket adjacent the lamination. In other words the castable material upon the ends of the laminations is cured lower and when the end cap 73 is applied thereto the material forms a bond with each other. That is to say, the cover cap 73 is pressed down tight against the castable material 58 of the stator by means of the pressure edges 75 of a pressure tool 74 that fits within a guide 76. The application of pressure between the two castable materials seals or bonds them together so that in effect there is provided one homogeneous arrangement of the castable material and the like material in the cover cap 73. A good bond between the two joining materials of a like nature is effected during the setting of the two adjoining materials. The cover cap 73 in the region where it is engaged by the pressure edges 75 is likewise pliable at the time that the pressure is applied therto by the pressure tool 74. Experience shows that a good joint may be made therebetween which has sufficient mechanical rigidity to hold the cover cap to the ends of the castable material upon the laminations.

Figure 15:
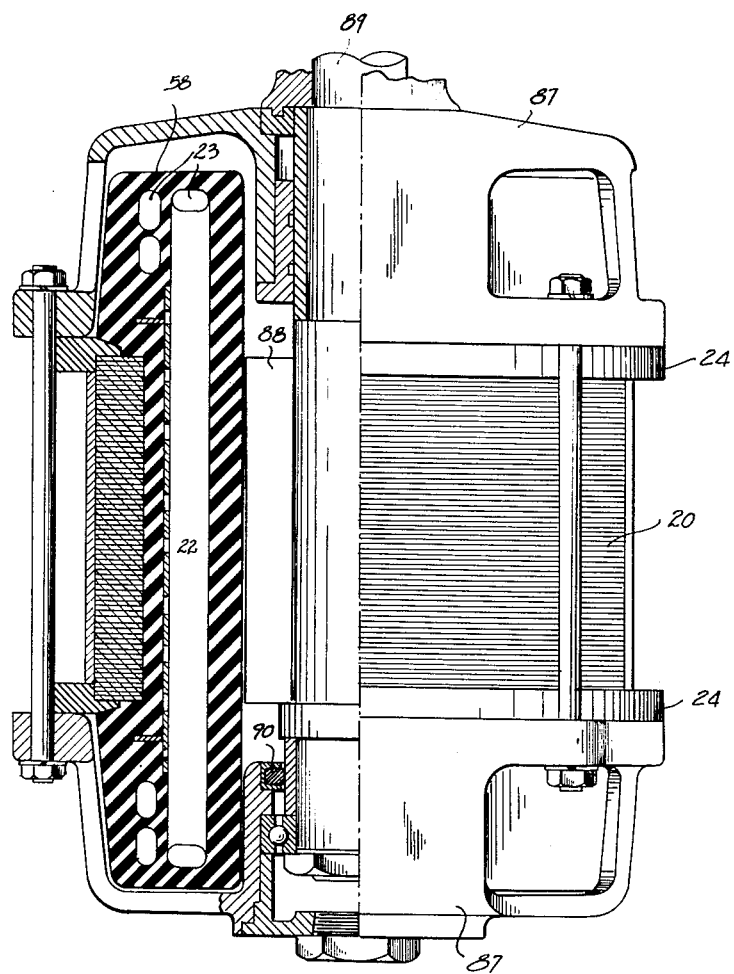
Figure 15 is a side view of an electric motor or dynamo-electric machine showing in cross-section a stator made with the casting dies of Figure 13.

In Figure 13 we show a modified form of the castable dies in that in this form the liquid resin or "Catalin" completely envelops the coil heads as well as the coil sides. In Figure 13 there are two castable dies, namely, a bottom housing 81 and a top housing 82 suitably secured to the ring plate 24 by means of the illustrated screws. A liquid heating jacket 83 is provided in the bottom housing 81 and a liquid heating jacket 84 is provided in the top housing 82 for curing the castable material about the coil heads of the winding. An overflow outlet 85 is provided in the top housing 82 for permitting the liquid resin or "Catalin" to overflow when the castable dies have been completely filled. During the early stages of the setting of the liquid resin or "Catalin" a vacuum may be applied to the pipe 86 for removing all air bubbles which may be present in the liquid resin. Similarly, a vacuum may be applied to the pipe 57 in Figure 1 for removing all air bubbles in the liquid resin. It is only necessary to apply the vacuum for a short period of time because when once the air bubbles are removed there is no need to keep the vacuum maintained. The upper end of the completed stator is shown in Figure 14 when made by the castable dies shown in Figure 13. A completed motor is shown in Figure 15 which shows the end bells 87 anchored to the ring plates 24 of the lamination. An armature or rotor 88 anchored to the shaft 89 is arranged to closely rotate within the stator in the ordinary manner. In the event that the motor is submersed below the level of a liquid such as water, the water may completely surround the armature and the stator but in no event will the water be able to contact the windings of the stator. A shaft seal 90 may be employed to keep the water or other liquid from the bearing 91 that supports the lower end of the shaft. Because of the economical construction of the embodiment of the windings within the stator by the castable material, we find that the motor may be useful for all industrial purposes as well as for immersible types of motors. The envelope produced by the castable material prevents dust or any other foreign matters from contacting the windings of the stator. The windings may be operated at high voltages and speeds and will withstand a great deal of vibration without damage.

Figure 16:
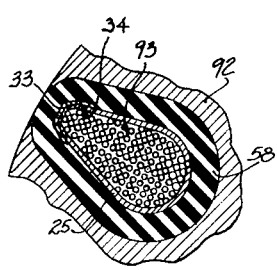
Figure 16 shows an enlarged cross-sectional view of a fragmentary portion surrounding a slot in a rotor after it has been cast or ejected with the plastic-tight material.

The Figure 16 shows a slot in a rotor which has been made by casting plastic-proof material about the windings 93 inserted in the slots of the magnetizable core 92 of the rotor. The sleeve 25 is employed to center the windings 93 in the slots. As shown both in Figures 6 and 16, the sleeves 25 are closed by a longitudinal tie-strip 33 which may be made of perforated metal or any other material to allow the castable material to flow therethrough. The closure strips 33 are substantially U-shaped in cross-section and are provided with small inwardly projecting tabs which fit in the small holes 34 in the marginal sides of the sleeves. The throat sides of the sleeves tend to spread when the wires are inserted therein and thus the tie-strips 33 may be easily mounted by simply pressing them against the outside of the throat sides of the sleeves 25 until the small tabs snap into the small holes 34, after which they are locked in place. The closure strips keep the windings in the sleeves 25.

Although we have described our invention with a certain degree of particularly, it is understood that the present disclosure has been made only by way of example and that numerous changes in the details of construction and the combination and arrangement of parts may be resorted to without departing from the spirit and the scope of the invention as hereinafter claimed.

We claim as our invention:

1. A liquid-tight winding element for a dynamo electric machine comprising a magnetizable core having a plurality of winding slots, a winding comprising coils with coil sides in said slots, sleeve means extending through the slots for stabilizing the coil sides in the slots at a distance from the inside surface of the slots, spacing means located at the ends of the core for holding the sleeve means away from the inside surface of the slots, and a mass of castable insulating material in the slots comprising a liquid proof container about each coil side and the sleeve means in the slots.

2. A liquid-tight winding element for a dynamo electric machine comprising a magnetizable core having a plurality of winding slots, a winding comprising coils with coil sides in said slots, sleeve means extending through the slots for stabilizing the coil sides in the slots at a distance from the inside surface of the slots, spacing means located at the ends of the core for holding the sleeve means away from the inside surface of the slots, and a mass of castable insulating material in the slots comprising a liquid proof container about each coil side and the sleeve means in the slots, said mass of castable insulating material terminating in an annular ring upon each end of the core.

3. A liquid-tight winding element for a dynamo electric machine comprising a magnetizable core having a plurality of winding slots, a winding comprising coils with coil sides in said slots and coil heads at the ends of the core, sleeve means extending through the slots for stabilizing the coil sides in the slots at a distance from the inside surface of the slots, spacing means located at the ends of the core for holding the sleeve means away from the inside surface of the slots, a mass of castable insulating material in the slots comprising a liquid proof container about each coil side and the sleeve means in the slots, said mass of castable insulating material terminating in an annular ring upon each end of the core and covering said spacing means, and means enclosing the coil heads to make a fluid-tight winding.

4. A liquid-tight winding element for an electrical device comprising a magnetizable core having a plurality of winding slots, a winding comprising coils with coil sides in said slots and coil heads at the ends of the core, sleeve means extending through the slots for stabilizing the coil sides in the slots at a distance from the inside surface of the slots, spacing means located at the ends of the core for holding the sleeve means away from the inside surface of the slots, a mass of insulating material in the slots comprising a liquid proof container about each coil side and the sleeve means in the slots, said mass of insulating material terminating in an annular ring upon each of the core and covering said spacing means, and cover plate means engaging the annular rings and enclosing the coil heads to make the winding completely fluid-tight.

5. A liquid-tight winding element for an electrical device comprising a magnetizable core having a plurality of winding slots, a winding comprising coils with coil sides in said slots and coil heads at the ends of the core, sleeve means extending through the slots for stabilizing the coil sides in the slots at a distance from the inside surface of the slots, spacing means located at the ends of the core for holding the sleeve means away from the inside surface of the slots, a mass of insulating material in the slots comprising a liquid proof container about each coil side and the sleeve means in the slots, said mass of insulating material terminating in an annular ring upon each end of the core and covering said spacing means, and cover plate means made of insulating material secured to the annular rings for enclosing the coil heads to make the winding completely fluid-tight.

6. A liquid-tight winding element for an electrical device comprising a magnetizable core having a plurality of winding slots, a winding comprising coils with coil sides in said slots and coil heads at the ends of the core, sleeve means extending through the slots for stabilizing the coil sides in the slots at a distance from the inside surface of the slots, spacing means located at the ends of the core for holding the sleeve means away from the inside surface of the slots, a mass of insulating material in the slots comprising a liquid proof container about each coil side and the sleeve means in the slots, said mass of insulating material terminating in an annular ring upon each end of the core and having embedded therein the spacing means and the coil heads to make a fluid-tight winding.

7. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves extending throughout the length of the slots and keeping the windings from contacting the sides of the slots, and a mass of castable resin in the slots and filling the spaces about the windings in said slots to mechanically support the windings, said sleeve having a wall structure including a perforated sheet of material to provide communication for said castable resin about said windings.

8. In the construction of a winding element having a magnetizable core with a plurality of winding slots and windings in said slots, the improvement of mechanical support means to support the windings in the slots, said mechanical support means comprising, in combination, a sleeve for each of the slots to envelope the winding, said sleeves extending throughout the length of the slots and keeping the windings from contacting the sides of the slots, and a mass of insulating material in the slots and filling the spaces about the windings in said slots to mechanically support the windings, said sleeve having a wall structure including a perforated sheet of material to provide communication for said insulating material about said windings.

9. In the construction of a winding element having a magnetizable core with a plurality of winding slots and windings in said slots, the improvement of supporting the windings in the slots, said improvement comprising, in combination, a sleeve for each of the slots to envelope the windings, spacing means at the ends of the core for engaging the sleeves and holding same from the side wall of the slots each said sleeve having a longitudinal opening through which the winding is inserted, and a mass of insulating material filling the said opening.

10. In the construction of a winding element having a magnetizable core with a plurality of winding slots and windings in said slots, the improvement of supporting the windings in the slots, said improvement comprising, in combination, a sleeve for each of the slots to envelope the windings, spacing means at the ends of the core for engaging the sleeves and holding same from the side wall of the slots each said sleeve having a longitudinal opening through which the winding is inserted, and a mass of insulating material filling the said opening, said mass of insulating material terminating in an annular ring upon each end of the core and covering said spacing means, said sleeves extending beyond the ends of the core and being embedded in the annular rings of insulating material.

FRANK J. SIGMUND.
WILLIAM S. HLAVIN.